Nov. 27, 1956     S. O. SUNDEN     2,771,667

METHODS OF MAKING LUBRICATING SYSTEMS AND DEVICES

Original Filed March 1, 1949

INVENTOR.

Stuart O. Sunden

BY Peter Fries, Jr.

Attorney

United States Patent Office 2,771,667
Patented Nov. 27, 1956

2,771,667

METHODS OF MAKING LUBRICATING SYSTEMS AND DEVICES

Stuart O. Sunden, Noroton Heights, Conn., assignor of forty percent to Peter Fries, Jr., New York, N. Y.

Original application March 1, 1949, Serial No. 78,943. Divided and this application September 26, 1950, Serial No. 186,893

2 Claims. (Cl. 29—420.5)

This invention relates to lubricating systems and devices.

An object of the invention is to provide a method of making a novel and improved form of lubricating device and system for use wherever it is desired to apply lubricating fluid to a part or machine element.

Another object of the invention is to provide a method of making an improved type of lubricating device adapted to be connected between a source of lubricating fluid and a machine part to be lubricated thereby, and which includes means for regulating the flow of the lubricating fluid to the part to suit the exact need of that part for lubrication.

A further object of the invention is to provide a method of making an improved type of lubricating device adapted to be connected between a source of lubricating fluid and a machine part to be lubricated thereby, and which is constructed and arranged as to receive in its lubricant inlet a body or flow of lubricant so as to constantly have its inlet filled with lubricant fluid, and which includes means interposed between its inlet and its outlet whereby the rate of flow of said lubricant through said means is reduced according to a predetermined pattern, whereby through suitable proportioning and dimensioning of said means the rate of oil fluid discharge from said lubricating device to said machine part may be predetermined and thus regulated from steady flow to widely spaced individual droplets of lubricant discharge.

Still another object of the invention is to provide a method of making an improved type of lubricating device having particular advantages in the lubrication of rotating shafts, applying lubricant to such shafts in the form of individual droplets of lubricant at a rate of flow or movement of such droplets regulated in accordance with the needs of the shaft being lubricated, and avoiding a wiping-on of such lubricant.

A further object of the invention is to provide a method of making improved means of droplet lubrication, adapted to be interposed intermediate a source of liquid lubricant and a machine part to be lubricated thereby, said lubrication means being capable of incorporation in substantially standard type pipe and tubing coupling devices, and also in adjustable lubrication valve housings with standard threaded inlets and outlets.

Another object of the invention is to provide a novel method of making an improved form of lubricating device which is simple in design, inexpensive to manufacture, and highly effective and efficient in operation.

Other objects and advantages of the invention will become apparent from the following description of a preferred embodiment thereof as illustrated in the accompanying drawings, and in which, Figure 1 is a sectional elevation of a bearing with a shaft rotatable therein, and with a first form of my improved lubricating device fitted thereto for providing lubrication to said shaft.

In the lubrication of machine parts it is quite important to suit the lubrication to the requirements of the shaft or other machine part being lubricated. Some such parts need a constant and copious flow of oil, and may be adequately lubricated by means well known in the art, which need not be described here. Further it is common to have in one machine, a large number of parts which need to be lubricated, each such part having different lubrication requirements. When all such parts on one machine must receive lubricant from a single source, as for example, an oil tank connected to each part by oil tubing, pressurization being achieved by positive pump means or merely, by gravity, some simple and inexpensive means must be found to adequately lubricate each such part according to its needs, and some simple and inexpensive means for making such means, and a manufacturing method. A solution to this problem is presented by the disclosure set forth and illustrated herein. In order to understand clearly the nature of the invention, and the best means for carrying it out, reference may now be had to the accompanying drawings, in which like numerals denote similar parts throughout the several views.

Figure 1:
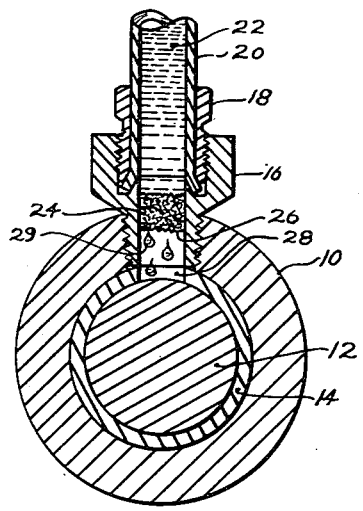

In Figure 1 is shown a bearing housing 10 which may be supported in any suitable manner, not shown, as, for example, by forming part of the frame of a machine, and having secured therein a bearing sleeve or lining 14 of bearing material, such as any suitable well known type including bronze, babbit metal, and other bearing alloys and compositions. A shaft 12 is disposed in the bearing sleeve 14 for rotation with respect thereto, it being thus necessary to provide lubrication for the shaft 12.

Such lubrication may be provided by means of oil 22 fed under high pressure from a pressurized oil source through a hollow pipe or tube 20. Where only one shaft is to be lubricated from the oil source, then it is possible to regulate the pressure and flow to suit the needs of the bearing. But when the shaft 12 is only one of many shafts of differing lubrication needs, all being fed from a single central pressurized oil source, then the problem is not so simple. My invention presents means for regulating the rate of lubrication to each such bearing, and also its nature, so that the oil pressure of the oil 22 in the feed pipe 20 may, for example, be on the order of 60 pounds per square inch, yet, if desired, only droplets 29 of oil at any desired rate, may be fed to the bearing to lubricate the shaft 12.

To accomplish this, I form an opening 28 through the bearing sleeve 14, to afford access to the bearing interior in which the shaft rotates. The opening 28 may conveniently be circular. A matching opening is formed through the bearing housing 10 overlying the opening 28, to threadedly receive the lower reduced threaded end portion of an axially bored bushing or coupling 16. The oil feed tube or pipe 20 has its lower end portion led into the upper enlarged portion of the axial bore of the coupling 16 as illustrated, the tube end being flared as shown to seat upon the upwardly convergent frusto-conical seat formed therein, and is pressed securely into this position to form a tight seal, by means of the externally threaded hollow nut 18 which is threaded into the coupling 16 and forces the tube end securely downwards upon its conical seat.

Inside the axial bore of the fitting 16 I place a core or cylindrical plug 24, which has a degree of porosity to the lubricant 22, which porosity is determined by the plug 24 itself which is thus placed in the direct path of the oil flow. As seen in Figure 1, the flow regulating plug 24 is made of suitable composition such as metallic and non-metallic ingredients formed by powder metallurgy into a mass through which oil will pass, at a rate dependent upon the porosity of the mass, the viscosity of the oil, and the pressure of the oil. The powder metallurgy by which such porous plugs are made, is known in the art, and will not be described in great detail herein.

For example, it may be made by briquetting copper and tin oxide powders with carbon or graphite and then heating the mixture, reducing the oxides to metal and simultaneously permitting the inter-diffusion of the formed copper and tin to yield a strong bronze matrix with a residual excess of graphite uniformly dispersed in the piece. The reduction and sintering may be carried out at temperatures below the melting point of the bronze, and preferably so, so that the resultant product is porous and spongy in structure. Also, the pores in the piece are intercommunicating and thus allow the entry of oil 22 from the pipe 20 into the plug 24 and hence ultimately the impregnation to varying degrees of the plug with the oil.

As a result of capillary action, oil is drawn through the plug 24 from the liquid oil mass 22, forming small oil droplets 29 as the oil exudes from the lower or discharge end 26 of the porous plug 24. These oil droplets 29 are free to fall as shown, directly upon the surface of the rotatable shaft 12, for lubricating the same. It is seen that there is no wiping action of the plug 24 upon the shaft surface, since, according to my invention, it is preferred that there be some space or distance between the discharge end 26 of the porous plug 24 and the shaft 12 to be lubricated, thus achieving true droplet lubrication.

The permeable plug 24 as thus manufactured by this sintering process, will have a somewhat fibrous structure, and it is preferable, for the purposes of my invention, that the oil intake and discharge ends of the plug retain their rough, fibrous character and not be smoothed out by machining. If such plugs are cut off from a length of porous material by a machining process, it is possible to form a tough outer skin on the ends of the plug, which is practically impermeable to oil and hence would entirely defeat the purpose of the plug. Hence, I prefer to break off the desired length of plug 24 from a greater piece or length of such material, leaving rough fibrous top and bottom end surfaces of the plug, as illustrated. This aids in provoking capillary action as mentioned above, and also in forming oil droplets at the discharge portion of the plug 24. To conveniently break off small lengths of such plug from a greater length, it is only necessary to insert such small length into a hollow tube, leaving the rest extending out of the tube, and then bend over the protruding portion of the length of porous material, when it will easily break off as desired. For example, the desired length of plug 24 may be inserted into the lower end of the coupling 16 and then broken off, and then pushed upwards inside the coupling 16 by means of a hollow tube having a diameter slightly less than the axial bore of the coupling 16 and very little wall thickness, so as not to bear against any of the surface 26 of the porous plug except that small periphery immediately adjacent to the inner wall of the bore of the coupling 16. Thus practically all of the lower surface 26 of the plug 24 remains rough and fibrous as desired.

In the course of pressing the plug 24 upwards into the coupling 16, it is found that the cylindrical outer surface of the plug is worked by the friction with the bore of the coupling 16, to form a cylindrical skin tightly and securely engaging the bore inner wall, to hold the plug securely against disengagement from position except by a high degree of direct force much greater than that of the pressurized oil 22. If desired, of course, the plug 24 may be supported from below by any suitable means, as by a hollow cylindrical thin walled bushing threaded into the lower end of the coupling 16, particularly to facilitate removal of the porous plug when that is required.

Those familiar with the art of powder metallurgy will know that by well known means, the porosity of the plug 24 and the other porous flow regulating media employed and shown in the other views of this application, may be varied over a wide range and closely controlled. Further, it is also apparent that such metallic flow regulators have considerable advantage over ceramic flow regulators, such as, for example, considerably higher maximum mechanical strength and resistance to both mechanical and thermal shock.

The porous metallic plugs may be pressed from copper and tin powders, instead of the metallic oxides mentioned above, with varying percentages of graphite added thereto, to form, when sintered, the porous masses from which the lengths of metallic porous material are produced, and the plugs are then broken off from the total length, with consequent roughened and fibrous oil intake and discharge ends. Silica may also be added to such metallic powders if desired, to produce the desired voids. By such methods of powder metallurgy, the degree of porosity may be varied and closely controlled from a fraction of one percent, up to about 40 percent by volume.

Figure 2:
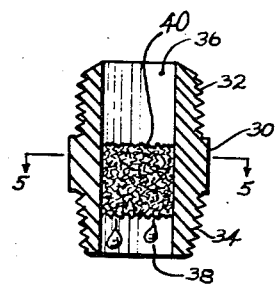
Figure 2 is a sectional elevation of a second form of pipe fitting incorporating my invention for lubrication purposes.
Figure 5:
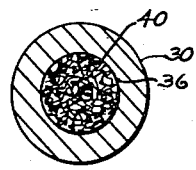
Figure 5 is a sectional plan view taken on plane 5—5 of Figure 2.

Figures 2 and 5 show a porous plug like that of Figure 1, but incorporated in a threaded bushing 30. The porous plug 40 also has roughened fibrous oil intake and discharge ends, so that the oil droplets 38 may be discharged therefrom, and is inserted inside the axial 36 of the bushing 30, which has its end portions threaded at 32 and 34 for engagement with a source of oil feed, and a bearing to be lubricated.

Figure 3:
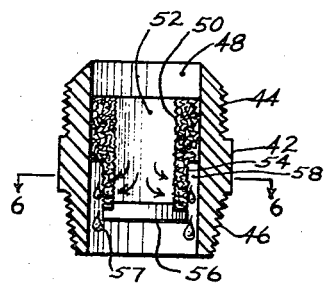
Figure 3 is a sectional elevation of a third form of pipe fitting incorporating my invention, and illustrating radial oil flow according to the invention.
Figure 6:
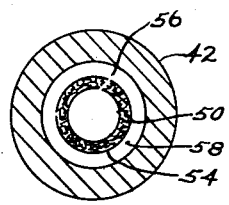
Figure 6 is a sectional plan view taken on plane 6—6 of Figure 3.

Figures 3 and 6 illustrate a modified form of the porous flow regulator, as incorporated in a bushing 42 which is also threaded at its upper and lower end portions 44 and 46 for connection purposes. Inside the axial bore 48 of the bushing, I dispose a hollow cylindrical porous metallic flow regulator 50, formed of the same metallic and/or non-metallic compositions mentioned for Figures 1 and 2, and having an axial bore 52 formed right through the flow regulator 50, so that oil from above can enter the bore 52 from any oil source such as the pipe 20 of Figure 1. However, I close the lower end of the bore 52 of the porous flow regulator 50, by means of a metal lower end cap 56 which is impervious to oil.

As a result, the oil entering the bore 52 must flow into the lower portion of the bore 52 and then radially outwards as shown by the arrows in Figure 3, and here it is noted that the outside diameter of the lower portion of the cylindrical flow regulator 50 is reduced so as to form an annular oil passageway 58 in which oil droplets 57 are formed and proceed downwards toward the shaft to be lubricated. It is also noted that the surface 54 of the annular passageway, that is, the surface of the porous cylinder, is roughened as is the interior of the bore 52, so as to facilitate the ingress of oil and the formation of droplets of oil upon radial discharge into the space 58.

This may be machined if necessary to produce the rough surface required, by using no coolant, and employing a dead sharp, pointshaped tool, about $\frac{1}{64}$ inch radius of diamond or tungsten carbide, taking a very light cut, .002" to .004" on diameter, with fine feed and high speed. Such machining may also be employed for the embodiment of Figure 4 to induce oil flow wherever roughtened surfaces are illustrated in the porous oil regulating medium.

The cap 56 of Figure 3 may be fixed in place in any suitable manner, as by brazing, welding, or otherwise.

It is seen that the rate of flow may be also regulated thus, by suitably proportioning the thickness of the portion through which the oil flow takes place, and its length in an axial direction, and also that hence higher oil pressures in the oil feed may be handled in the embodiment of Figure 3 in view of the radial flow.

Figure 4:
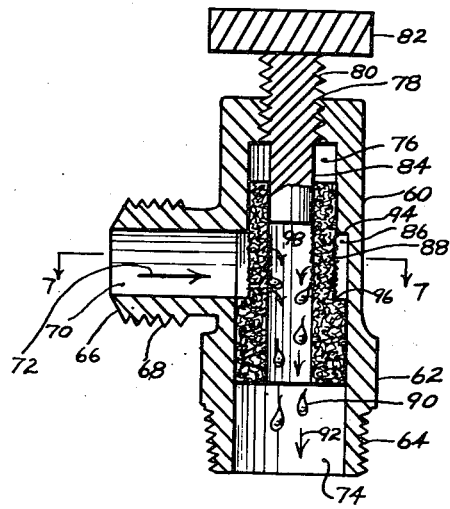
Figure 4 is a sectional elevation of a fourth form of my invention illustrating radial oil flow with manual flow regulation, the same being incorporated in a suitable housing.
Figure 7:
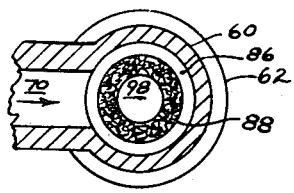
Figure 7 is a fragmentary sectional plan view taken on plane 7—7 of Figure 4.

Figures 4 and 7 illustrate a further embodiment, in which there is a flow regulator housing or body 60 the lower oil discharge portion 62 of which is threaded at 64 for engagement with a bearing in the manner, for example of the coupling 16 of Figure 1, for lubricating a shaft. Oil under pressure enters the oil intake bore 70 in the direction of the arrow 72, from the end 66, which is threaded at 68 for coupling to an oil feed pipe in any suitable manner.

The housing 60 also has an axial bore 76 into which is fitted a hollow cylindrical porous metallic flow regulator 88 of the same material as the plug 24 of Figure 1. The bore 76 is enlarged below the shoulder 94 and there is thus formed around the middle portion of the porous flow regulator 88, an annular oil entry chamber or vestibule 86 into which the oil flows from the duct 70, and it is seen that the porous surface lining this vestibule 86 is roughened to facilitate oil flow into the porous metallic regulator. The regulator 88 has an axial bore 98 into which the oil droplets 90 move when formed as shown after the oil flows radially inwardly from the vestibule 86, through the porous medium, forming droplets on the roughened inner surface of the bore 98, which drop downwards in the direction of the arrow 92, leaving through the discharge end 74 of the regulator housing.

In this embodiment, I also provide for manual regulation of the rate of oil flow, by means of a plunger 84 which is threaded at 80 to threaded engagement with the opening 78 in the upper end of the housing 60. The plunger 84 is turned by the head 82, so as to enter further inside the bore 98 or to be retracted therefrom. The plunger 84 as shown, is of such length as to have its lower end reach entirely inside the bore 98 to the depth of the shoulder 96, so as to block oil passage when adjusted to reach that far down. Or it may be turned up to the position of Figure 4, when it does not interfere with the oil flow at all. The interior of the bore 98 is preferably made rough as shown, between the locations 94 and 96, so as to confine flow radially to that region, and the lower portion of the plunger 84 is not of such great diameter as to work the metal of the porous flow regulator to prevent oil flow therethrough, but merely a suitably close fit, so as not to impair the roughness.

As examples of the results which may be obtained, with this invention, with a plug of the type shown in Figure 1, having a diameter of 0.182 inch and length of ⁷⁄₁₆ inch, oil of viscosity S. A. E. 40 at 94 degrees Fahrenheit temperature, under pressure of 53 pounds per square inch, provided oil discharge of one drop every 15 minutes to atmosphere, that is, at the rate of 0.45 cubic inch in 15 hours. For a plug of the same diameter, but length of ⁵⁄₁₆ inch, oil pressure of 53 pounds per square inch, and same temperature, but viscosity S. A. E. 20, the rate of oil discharge was three drops every minute, that is, 0.45 cubic inch in 60 minutes.

Although I have described my invention in specific terms, it is to be understood that variations may be made in size, shape, materials, arrangement and the steps in the methods taught herein, without departing from the spirit and scope of the invention.

This application is a divisional application of my co-pending patent application Serial Number 78,943, filed March 1, 1949, for Lubricating Systems and Devices, now abandoned.

I claim:

1. The process of making a porous flow retarding and regulating plug, comprising the steps of briquetting copper and tin oxide powders with silica and graphite, then heating the mixture, reducing the oxides to metal and interdiffusing the formed copper and tin to yield a strong bronze matrix with an excess of graphite, forming an excess length of said porous metal of fluid flow retarding properties, breaking off said excess length to expose a rough and fibrous end surface, and breaking off an intermediate length of said remaining length to expose a second rough and fibrous end surface.

2. The process of making a flow retarding and regulating plug according to claim 1, characterized further in that all surfaces of said intermediate remaining length of metal are covered with the exception of said rough and fibrous end surfaces, to render said covered surfaces impermeable to fluid flow, whereby fluid flow is constrained to take place only between said fibrous end surfaces.

References Cited in the file of this patent

UNITED STATES PATENTS

| | | |
|---|---|---|
| 1,472,631 | Bowman | Oct. 30, 1923 |
| 1,687,780 | Neale | Nov. 30, 1926 |
| 2,111,357 | Cornell | Mar. 15, 1938 |
| 2,285,583 | Jennings | June 9, 1942 |
| 2,286,809 | Hutchison | June 16, 1942 |
| 2,297,817 | Truxell et al. | Oct. 6, 1942 |
| 2,448,147 | Jacobsen | Aug. 31, 1948 |
| 2,478,856 | Beaver | Aug. 9, 1949 |
| 2,515,394 | Clarkson | July 18, 1950 |
| 2,576,610 | Kunzog | Nov. 27, 1951 |